Patented Dec. 9, 1947

2,432,480

UNITED STATES PATENT OFFICE 2,432,480

BUTADIENE-ALPHA CHLOROCROTONATE COPOLYMER

John R. Long, Stow, Ohio, assignor to Wingfoot Corporation, Akron, Ohio, a corporation of Delaware No Drawing. Application March 6, 1943, Serial No. 478,296

1 Claim. (Cl. 260—93)

This invention relates to copolymers of alpha chlor-crotonates and butadiene or another diene monomer. The products are rubber like.

Various attempts have been made to produce a copolymer from crotonic acid and its derivatives. The interest in such compounds has, no doubt, been heightened by the fact that copolymers formed from derivatives of the related acrylic acid have given such promise. However, the production of copolymers from derivatives of crotonic acid has not held much promise of success. This appears to be due to the fact that the added methyl group, which prolongs the chain of the acid molecule, apparently buries the double bond, and the availability of this double bond in the production of copolymers is thus greatly reduced or entirely blotted out. In spite of this and the unsuccessful use of many other derivatives of crotonic acid, it has now been found that the alpha chlorcrotonates will copolymerize with butadiene and related monomers. The following examples are illustrative:

Example 1

A mixture of 10 cc. 0.2 molar disodium phosphate, 10 cc. solution of 6 per cent of a mixture of sodium alkyl sulfates, 0.48 g. carbon tetrachloride, 0.5 cc. 5 per cent potassium cyanide, 0.5 cc. 10 per cent acetalydehyde, 0.133 g. sodium perborate, 9.6 g. butadiene, and 6.4 g. methyl alpha chlorcrotonate was tumbled in a 4-ounce screw-cap bottle at 38° C. for 21 hours. The latex thus formed was coagulated with alcohol. The coagulum was washed with water and dried. The product was very tough and rubbery.

Example 2

Ethyl alpha chlorcrotonate was substituted for the methyl alpha chlorcrotonate of Example 1. The mixture was tumbled for 41 hours. After similarly coagulating, washing, and drying, the product was a soft rubber.

Example 3

Tetrahydrofurfuryl alpha chlorcrotonate was substituted for methyl alpha chlorcrotonate in Example 1. The mixture was tumbled for 26 hours. After similarly coagulating, washing, and drying, the product was a soft, very tough rubber.

In place of butadiene, other diene monomers may be employed, such as isoprene; 2,3 dimethyl butadiene; piperylene; 2-methyl-1,3-pentadiene, etc. A part of the butadiene or other diene monomer may be replaced by acrylonitrile; methacrylonitrile; an acrylate, including a methacrylate or a chloracrylate; a styrene, including m-chlorostyrene or p-chlorostyrene; etc.

The alpha chlorcrotonates which can be copolymerized with butadiene or other diene monomer include methyl alpha chlorcrotonate, ethyl alpha chlorcrotonate, isopropyl alpha chlorcrotonate, sec. butyl alpha chlorcrotonate, benzyl alpha chlorcrotonate, n-butyl alpha chlorcrotonate, etc.

What I claim is:

A rubber-like copolymer resulting from the copolymerization of a mixture of 40 percent of ethyl alpha-chlorocrotonate and 60 percent of butadiene-1,3.

JOHN R. LONG.

REFERENCES CITED

The following references are of record in the file of this patent:

UNITED STATES PATENTS

| Number | Name | Date |
|---|---|---|
| 2,228,270 | Hopff | Jan. 14, 1941 |